United States Patent [19]
Coats et al.
[11] 4,380,004
[45] Apr. 12, 1983

[54] EMERGENCY SOUND DETECTOR DEVICE

[76] Inventors: Montgomery R. Coats, 2821 Blue Spruce Rd.; Gwen V. Janssen, 1725 Kings Rd., both of Edmond, Okla. 73034

[21] Appl. No.: 245,593

[22] Filed: Mar. 19, 1981

[51] Int. Cl.$^3$ .......................... G08G 1/00; G01S 7/40
[52] U.S. Cl. .......................................... 340/34; 340/32
[58] Field of Search ................ 340/32, 33, 34, 825.71, 340/825.72, 825.73, 825.74, 825.75, 825.76; 179/1 P, 1 VE; 343/7 VM; 455/297

[56] References Cited

U.S. PATENT DOCUMENTS

| | | | |
|---|---|---|---|
| 2,545,218 | 3/1951 | Weber et al. | 340/34 |
| 3,014,199 | 12/1961 | Dill et al. | |
| 3,412,378 | 11/1968 | Thomas | |
| 3,568,144 | 3/1971 | Streb | |
| 3,626,365 | 12/1971 | Press et al. | |
| 3,673,560 | 6/1972 | Barsh et al. | |
| 3,772,641 | 11/1973 | Grosser et al. | |
| 3,854,119 | 12/1974 | Friedman et al. | |
| 3,859,623 | 1/1975 | Koehler | |
| 3,873,963 | 3/1975 | Neal et al. | |
| 3,978,447 | 8/1976 | Bankes | |
| 4,013,994 | 3/1977 | Ragano et al. | |
| 4,100,529 | 7/1978 | Evans | |
| 4,158,190 | 6/1979 | Stefanov | |
| 4,209,769 | 6/1980 | Chronerberry | 340/34 |
| 4,316,173 | 2/1982 | Matsumura et al. | 340/32 |

*Primary Examiner*—Thomas A. Robinson
*Attorney, Agent, or Firm*—E. Harrison Gilbert, III

[57] ABSTRACT

A low-pass filter passes a spectrum of electrical signals which are utilized to establish a threshold level with which electrical signals having frequencies in a relatively higher range are compared to determine if a warning sound is present in the sounds in the vicinity of a receiver unit for receiving the ambient sound. If the rectified magnitude of the signals having the higher frequencies exceeds the rectified and variably adjusted magnitudes of the signals having lower frequencies, a visual indication is given to communicate the existence of a warning sound in the ambient sounds.

27 Claims, 2 Drawing Figures

EMERGENCY SOUND DETECTOR DEVICE

BACKGROUND OF THE INVENTION

This invention relates generally to apparatus for discriminating among sounds and for communicating the existence of a predetermined sound and more particularly, but not by way of limitation, to apparatus for warning of the presence of an emergency signal having a predetermined frequency as emitted by an emergency vehicle or the like.

A person driving a vehicle should be constantly aware of ambient sounds because the vehicle must be operated to yield the right of way to an emergency vehicle which is emitting an emergency signal (e.g., an ambulance). Maintaining the necessary constant awareness is often difficult for the driver because, for example, he or she may have a physical hearing impairment or he or she may have the vehicle windows rolled up and the air conditioner and/or radio turned on. Emergency signals may also not be detected by the driver if the vehicle has a high degree of noise associated with it as may be the case in a school bus carrying several children. To relieve the driver of the difficult task of continuously listening for particular ambient sounds, there is the need for a device which detects sounds external to the compartment in which the vehicle driver is riding, which discriminates among all detected ambient sounds to select an emergency signal emitted by an emergency vehicle, and which communicates this detection and discrimination to the driver.

It is known that sirens, such as may be on ambulances, and car horns emit attention-attracting sounds when they are operated. These sounds have frequencies primarily, if not entirely, within the frequency band from approximately 2 kHz to approximately 4 kHz because research has shown that sounds in this range are the most attention-attracting to humans. Because the emergency signals are within this range, an apparatus which warns the driver of the existence of such signals must provide means for detecting signals within this range.

Although it is known that warning signals provided by emergency vehicles have frequencies within the aforementioned range, appropriate detection of the warning signals cannot be made by merely monitoring this one frequency range because ambient noise can create false warning signals. For example, it is known that the relative wind movement between the vehicle in which the driver to be warned is riding and the atmosphere around the vehicle produces signals varying with the speed of the vehicle. It is known that this wind noise produces high frequency signals which can be used to reduce or prevent the detection of false warning signals. This is illustrated in U.S. Pat. No. 4,158,190 in the name of Stefanov. The described Stefanov device uses a high-pass filter to detect erratic, random signals and to inhibit the driver notification means when such signals are detected so that the driver is not misinformed by a false signal.

Although it is known that wind produces high frequency signals which can be used in the aforementioned manner, we have found that the wind noise factor is not as much a high frequency shift with car velocity as it is an amplitude increase over a band of frequencies. Specifically, the majority of energy in this noise is contained in the range of frequencies below 1 kHz.

Utilizing the energy of the wind noise signals in this relatively low frequency band to set a threshold against which the warning signals, having relatively higher, predetermined frequencies, detected by the device are compared enables the sensitivity of the device to be increased by a significant factor over a device using a high-pass filter to measure the energy in the wind noise at frequencies above the frequencies of the true warning signal and to set a threshold based thereon. This low frequency energy utilization gives the driver greater protection at low driving speeds because the threshold is relatively low resulting from the lesser relative wind speed. Although adequate protection is also provided for high speed highway driving, the greater low speed protection is most important because most accidents involving emergency vehicles occur at in-town speeds, such as below 40 mph.

Utilizing the low frequency energy is also advantageous because it minimizes device performance variations resulting from differences in types of microphones which may be used. This variation minimization results because the low frequency threshold detector effectively utilizes the ratio of band-pass energy to lowpass energy.

SUMMARY OF THE INVENTION

The present invention overcomes the above-noted and other shortcomings of the prior art by providing a novel and improved emergency sound detector device. This device utilizes the energy from the relatively low frequency components of wind noise to set a threshold against which sounds detected in the pass-band containing the frequency or frequencies of the emergency signal are compared. The present invention provides a device which has a significantly improved sensitivity for providing greater assurance that a warning signal will be detected when the vehicle to be warned is moving at a relatively low speed. Additionally, the present invention provides a warning signal detector having an improved performance resulting, at least in part, from the reduction of operating variations which might result from the use of different types of microphones.

Broadly, the present invention provides an apparatus for detecting a warning sound emitted by an emergency vehicle or the like. The apparatus comprises first monitor means for monitoring a first predetermined range of frequencies which includes at least a portion of the spectrum of frequencies of the emitted warning sound. The apparatus further includes a second monitor means for monitoring a second predetermined range of frequencies which are lower than the frequencies of the first predetermined range of frequencies. The apparatus further includes comparator means for comparing a first magnitude derived from an electrical signal detected to have a frequency within the first predetermined range of frequencies monitored by the first monitor means with a second magnitude derived from an electrical signal detected to have a frequency within the second predetermined range of frequencies monitored by the second monitor means. Indicator means, responsive to the comparator means, is also included in the apparatus for indicating when the first magnitude is greater than the second magnitude.

The second monitor means includes low-pass filter means and rectifier means for rectifying each detected electrical signal having a frequency within the second range of frequencies. The second range of frequencies includes the frequencies at which signals generated by wind movement relative to the apparatus have a substantial quantity of their energy. In the preferred embodiment of the present invention the second range of frequencies includes generally those frequencies below approximately 1 kHz and more specifically those frequencies between approximately 250 Hz and approximately 800 Hz.

The second monitor means further includes variable setting means for setting a selectable threshold level and for electrically superimposing the threshold level with the rectified signal from the rectifying means. The superimposed threshold level and rectified signal define the second magnitude against which the first magnitude is compared by the comparator means.

From the foregoing, it is a general object of the present invention to provide a novel and improved emergency sound detector device. Other and further objects, features and advantages of the present invention will be readily apparent to those skilled in the art when the following description of the preferred embodiment is read in conjunction with the accompanying drawings.

DETAILED DESCRIPTION OF A PREFERRED EMBODIMENT OF THE INVENTION

Figure 1:
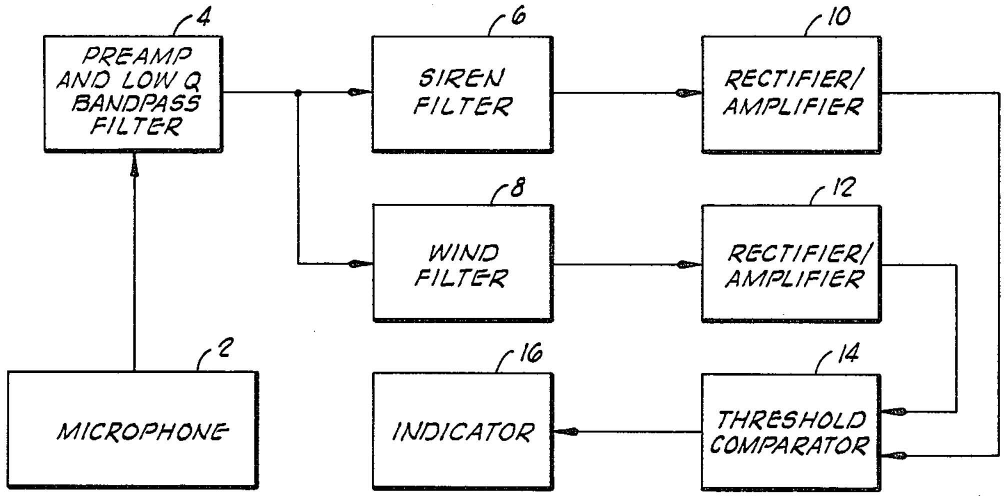
FIG. 1 is a block diagram of a preferred embodiment of the present invention.

With reference to the drawings a preferred embodiment of the present invention will be described. An apparatus for warning a driver of a vehicle of the presence of an emergency signal having a predetermined frequency as emitted by an emergency vehicle is shown in the functional block diagram of FIG. 1. FIG. 1 shows that the invention includes a transducer (specifically a microphone 2) which transduces ambient sounds into corresponding electrical signals thereby providing an input to a pre-amplifier and filter means 4. An output from the preamplifier and filter means 4 is electrically connected to an input of a siren filter means 6 and an input of a wind filter means 8. The electrical signals passed by the siren filter means 6 are suitably conditioned in a first rectifier means 10, and the electrical signals passed by the wind filter means 8 are suitably conditioned in a second rectifier means 12. Outputs from the rectifier means 10 and 12, which are amplified in the preferred embodiment as indicated by the labelling in FIG. 1, are provided to respective inputs of a threshold comparator means 14. Threshold comparator means 14 provides an output to an indicator means 16 when the threshold as set by the wind filter means 8 and the rectifier means 12 is exceeded by the output from the siren filter means 6 and the rectifier means 10.

In the preferred embodiment the microphone 2 is positioned on the outside of the vehicle externally of the compartment in which the vehicle driver operates the vehicle. For example, the microphone 2 may be placed in a position suitable for a radio antenna. The microphone 2 is electrically connected to the remaining elements 4–16 which are preferably located on a printed circuit board mounted in a small enclosure placed on the dashboard inside the driver compartment. More particularly, the microphone 2 is connected to the preamplifier and filter means 4 at a suitable junction, such as the one designated by reference numeral 20 shown in FIG. 2. The microphone 2 detects ambient sounds and converts them into corresponding electrical signals which are provided through the junction 20 to the input of the pre-amplifier and filter means 4. In the preferred embodiment the microphone 2 is a small, omni-directional microphone having a relatively flat frequency response to 10 kHz.

The pre-amplifier and filter means 4 receives the electrical signals corresponding to the ambient sounds detected by the microphone 2. The pre-amplifier and filter means 4 is preferably a low Q device. In the preferred embodiment shown in FIG. 2 the pre-amplifier and filter means 4 includes a first operational amplifier means 22 having parallel capacitor/resistor negative feedback means 24 connected between its output and its inverting input. In the preferred embodiment the preamplifier and filter means 4 has a quality (Q) factor of approximately 0.5 and a voltage gain of approximately 18 at the filter center frequency of 2.8 kHz.

The siren filter means 6 and the rectifier means 10 provide a first monitoring means for monitoring a first predetermined range of frequencies which includes at least a portion of the spectrum of frequencies of the emitted warning sound. This range of frequencies particularly includes the predetermined frequencies by which the warning sound is identified.

The siren filter means 6 provides a first filter means for passing electrical signals which are received from the preamplifier and filter means 4 and which have frequencies within the first predetermined range. In the preferred embodiment shown in FIG. 2 the first filter means 6 is a band-pass filter constructed from a state variable active filter comprising second operational amplifier means specifically including three operational amplifiers 26, 28 and 30. In the preferred embodiment the band-pass filter means is a high Q device having a quality factor of approximately 5.5 and has a center frequency of 2.8 kHz. The output of the second operational amplifier 28 is connected via suitable electrical connecting means to the input of the rectifier means 10.

The first rectifier means 10 effectively rectifies the electrical signals passed through the pass-band of the first filter means 6. In the preferred embodiment shown in FIG. 2 the rectifier means 10 includes third operational amplifier means 32 having a resistive negative feedback means 36 connected to the inverting input and the output of an operational amplifier 34 included within the operational amplifier means 32. Connected to the non-inverting input of the operational amplifier 34 is an amplitude limiting means in the specific form of a diode 37 having its cathode connected to the non-inverting input of the operational amplifier 34 and having its anode connected to ground. A rectified and amplified signal is provided at the output of the third operational amplifier means 32.

The wind filter means 8 and the second rectifier means 12 form a second monitor means for monitoring a second predetermined range of frequencies which are lower than the frequencies of the first predetermined range of frequencies monitored by the first monitor means. The second range of frequencies particularly includes frequencies at which signals, generated at least in part by wind movement relative to the apparatus constructed in accordance with the present invention, have a substantial quantity of their energy. For the present invention which is contemplated to be used in a motorized vehicle, the signals generated by air moving relative to the vehicle generate signals having a substantial quantity of their energy in the frequency range below approximately 1 kHz and more specifically within the range of frequencies between approximately 250 Hz and approximately 800 Hz.

To achieve the proper filtering in this frequency range below 1 kHz, the preferred embodiment of the present invention includes the wind filter means 8 comprising a second filter means having a fourth operational amplifier means 38. The operational amplifier means 38 has a parallel capacitor/resistor feedback means 40 connected between its output and its inverting input. In the preferred embodiment the second filter means is a low-pass filter which passes the electrical signals received from the preamplifier and filter means 4 and having frequencies within a second predetermined range as defined by the limiting frequencies of approximately 250 Hz. and approximately 800 Hz.

The rectifier means 12 rectifies the detected electrical signals having a frequency within the second range of frequencies passed by the second filter means 8. The rectifier means 12 includes amplitude controlling means for limiting the amplitude of the electrical signals passed by the low-pass filter means 8. In the preferred embodiment the amplitude controlling means comprises a diode 42. The diode 42 limits the amplitude of the signals coming into the rectifier means 12 by limiting the magnitude to which the incoming signal can extend below ground potential. The diode 42 functions in a manner similar to the diode 37 of the first rectifier means 10.

The rectifier means 12 further includes variable setting means for setting a selectable threshold level and for electrically superimposing the threshold level with the rectified signal of the rectifying means 12. The variable setting means includes fifth operational amplifier means 44 and variable resistive means 46 (e.g., a potentiometer). The operational amplifier means 44 includes an inverting input, a non-inverting input, and an output. The non-inverting input receives the electrical signals passed by the second filter means and also has the variable resistive means 46 connected thereto. By controllably selecting the setting of the variable resistive means 46, a minimum level which the output of the first rectifier means 10 must exceed before the apparatus of the present invention warns of the presence of an emergency signal is established. Thus, the variable setting means provides means for providing a threshold level in the present invention.

The operational amplifier means 44 also has the cathode of the diode 42 connected to its non-inverting input. The inverting input of the operational amplifier means 44 has a resistive means 48 connected thereto and to the output of the amplifier means 44 for providing negative feedback. The output of the amplifier means 44 is connected to an input of the threshold comparator means 14.

The threshold comparator means 14 compares a first magnitude derived from the electrical signal detected to have a frequency within the first predetermined range of frequencies monitored by the first monitor means with a second magnitude derived from an electrical signal detected to have a frequency within the second predetermined range of frequencies monitored by the second monitoring means. In the preferred embodiment shown in FIG. 2 the comparator means 14 compares the output of the first rectifier means 10 with the output of the second rectifier means 12. The final outputs of the two rectifier means are the low-pass d.c. averages of the signals provided by the operational amplifier 34 and the operation amplifier 44.

These two outputs are connected to respective inputs of a sixth operational amplifier means 50 which is included in the comparator means 14. The sixth operational amplifier means 50 functions as an analog comparator means having a first input means for receiving the output from the first rectifier means 10 and having second input means for receiving the output from the operational amplifier means of the second rectifier means 12. When an appropriate difference is detected between the two incoming signals, the comparator means provides an output to the indicator means 16.

The indicator means 16 of the present invention comprises an oscillator means 52 and a notifier means 54. The indicator means 16 is responsive to the comparator means 14 for indicating when the first magnitude is greater than the second magnitude as determined by the comparator means 14. For the preferred embodiment the indicator means 16 is actuated when the output of the first rectifier means 10 exceeds the output of the first rectifier means 12. This actuation occurs when the ambient sound contains an emergency signal which is detected by the present invention and which exceeds the threshold level.

Figure 2:
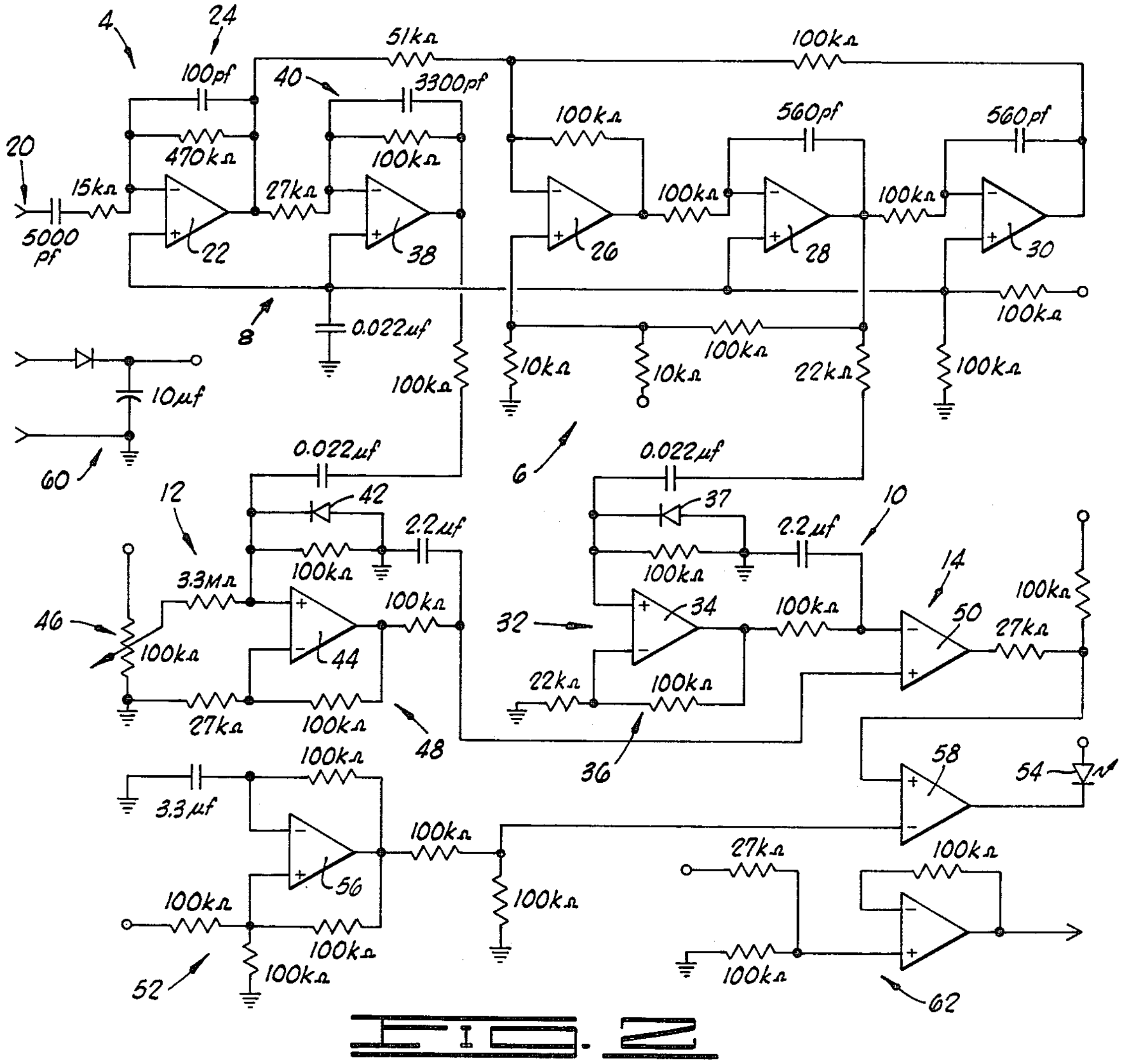
FIG. 2 is a schematic circuit diagram of the preferred embodiment of the present invention.

The oscillator means 52 of the indicator means 16 includes a seventh operational amplifier means 56 having suitable electrical components connected thereto, such as is illustrated in FIG. 2, to provide an oscillating electrical signal.

The indicator means 16 also includes an eighth operational amplifier means 58 having an inverting input means for receiving the oscillating electrical signal provided by the oscillator means 52 and having a non-inverting input means for receiving the output from the threshold comparator means 14. The eighth operational amplifier means 58 is specifically shown constructed as an analog comparator means for functioning as an analog gate for controllably outputting an oscillating signal corresponding to the oscillating signal of the seventh operational amplifier means 56 in the oscillator means 52.

The oscillating output from the operational amplifier means 58 is provided to the notifier means 54. In the preferred embodiment the notifier means 54 is a light-emitting diode which is suitably mounted on the external panel of the preferred embodiment enclosure and which flashes in response to the oscillating signal of the eighth operational amplifier means 58. This flashing communicates the presence of the emergency signal as detected by the present invention.

The present invention also includes a power supply means, including elements indentified by the reference numerals 60 and 62, for providing a suitable voltage and current to the apparatus.

It is to be noted that the specific component values set forth in FIG. 2 are representative of a specific embodiment of the preferred embodiment of the present invention; however, other suitable values can be used and yet remain within the scope of the present invention.

In operation the microphone 2 receives ambient sounds and converts them into corresponding electrical signals which are processed by the preamplifier and filter means 4. The output from the preamplifier and filter means 4 is provided to the respective inputs of the siren filter means 6 and the wind filter means 8.

The siren filter means 6 passes only those electrical signals having frequencies within the pass-band of the filter. In the preferred embodiment of the present invention this pass-band includes the range between approximately 1.5 kHz and approximately 4 kHz which is the frequency range in which the most attention-attracting sirens and other warning devices operate to notify vehicle drivers. The signals passing through the pass-band of the siren filter 6 are rectified, amplified and the low-pass d.c. average formed by the rectifier means 10.

The electrical signals provided to the input of the wind filter means 8 are filtered thereby. Because the wind filter means 8 is a low-pass filter, the electrical signals passing to the output of the wind filter means 8 have frequencies which are lower than the frequencies of the signals passed by the siren filter means 6. The signals passed by the wind filter means 8 are rectified, amplified and the low-pass d.c. average formed by the rectifier means 12. Additionally, the rectified signals are superimposed on a threshold level as set by the threshold setting means including the variable resistive means 46.

The rectified signal output by the rectifier means 10 comprises the first magnitude which is utilized by the threshold comparator means 14, and the superimposed threshold level and rectified signal from the rectifier means 12 defines the second magnitude which is compared by the threshold comparator means 14 with the first magnitude.

When the first magnitude representing a possible warning signal exceeds the second magnitude representing the threshold comprising a variably set voltage level and the voltage derived from wind or other noise detected in the low pass-band of the wind filter means 8, the operational amplifier means 50 of the threshold comparator means 14 provides an output which is applied to the operational amplifier 58. This output from the threshold comparator means 14 permits the oscillating electrical signals generated by the oscillator means 52 to enable the amplifier 58 to pulse the light-emitting diode 54 whereby a flashing light signal is communicated to the vehicle driver signifying the presence of a warning signal in the ambient sounds. Upon receiving this visual indication the driver can make further visual inspection to detect the location from which the warning signal is being emitted and appropriately maneuver the vehicle to avoid a possible collision with the source of the warning signal.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art which changes are encompassed within the spirit of this invention as defined by the appended claims.

What is claimed is:

1. An apparatus for detecting a warning sound emitted by an emergency vehicle or the like, comprising:
   first monitor means for monitoring a first predetermined range of frequencies including at least a portion of the spectrum of frequencies of the emitted warning sound;
   second monitor means for monitoring a second predetermined range of frequencies, the frequencies of the second predetermined range of frequencies being lower than the frequencies of the first predetermined range of frequencies;
   comparator means for comparing a first magnitude derived from an electrical signal detected to have a frequency within the first predetermined range of frequencies monitored by said first monitor means with a second magnitude derived from an electrical signal detected to have a frequency within the second predetermined range of frequencies monitored by said second monitoring means; and
   indicator means, responsive to said comparator means, for indicating when the first magnitude is greater than the second magnitude.

2. An apparatus as defined in claim 1, wherein the range of frequencies monitored by said second monitor means includes frequencies between approximately 250 Hz. and approximately 800 Hz.

3. An apparatus as defined in claim 2, wherein said second monitor means includes:
   low-pass filter means; and
   rectifier means for rectifying the detected electrical signal having a frequency within the second range of frequencies.

4. An apparatus as defined in claim 3, wherein said second monitor means further includes variable setting means for setting a selectable threshold level and for electrically superimposing the threshold level with the rectified signal from said rectifying means, said superimposed threshold level and rectified signal defining the second magnitude.

5. An apparatus as defined in claim 1, wherein said second monitor means includes:
   low-pass filter means; and
   rectifier means for rectifying the detected electrical signal having a frequency within the second range of frequencies.

6. An apparatus as defined in claim 5, wherein said second monitor means further includes variable setting means for setting a selectable threshold level and for electrically superimposing the threshold level with the rectified signal from said rectifying means, said superimposed threshold level and rectified signal defining the second magnitude.

7. An apparatus as defined in claim 1, wherein said second monitor means includes variable setting means for setting a selectable threshold level and for electrically superimposing the threshold level with the rectified signal from said rectifying means, said superimposed threshold level and rectified signal defining the second magnitude.

8. An apparatus for warning of the presence of an emergency signal having a predetermined frequency, comprising:
   first monitor means for monitoring signals having frequencies within a first range of frequencies, said first range of frequencies including the predetermined frequency of the emergency signal;
   second monitor means for monitoring signals having frequencies within a second range of frequencies, said second range of frequencies including frequencies at which signals, generated by wind movement relative to said apparatus, have a substantial quantity of their energy;
   comparator means for comparing the signals monitored by said first monitor means with the signals monitored by said second monitor means; and
   indicator means, responsive to said comparator means, for communicating when the emergency signal has been monitored by said first monitor means.

9. An apparatus as defined in claim 8, wherein the range of frequencies monitored by said second monitor means includes frequencies between approximately 250 Hz. and approximately 800 Hz.

10. An apparatus as defined in claim 9, wherein said second monitor means includes:

low-pass filter means; and rectifier means for rectifying the detected signals having frequencies within the second range of frequencies.

11. An apparatus as defined in claim 10, wherein said second monitor means further includes variable setting means for setting a selectable threshold level electrically superimposable on the rectified signals from said rectifying means.

12. An apparatus as defined in claim 8, wherein said second monitor means includes:

low-pass filter means; and rectifier means for rectifying the detected signals having frequencies within the second range of frequencies.

13. An apparatus as defined in claim 12, wherein said second monitor means further includes variable setting means for setting a selectable threshold level electrically superimposable on the rectified signals from said rectifying means.

14. An apparatus as defined in claim 8, wherein said second monitor means includes variable setting means for setting a selectable threshold level electrically superimposable on the rectified signals from said rectifying means.

15. An apparatus for warning of the presence of an emergency signal, comprising:

first filter means for passing electrical signals having frequencies within a first predetermined range;

first rectifier means for electrically rectifying the electrical signals passed by said first filter means and for providing an output thereof;

second filter means for passing electrical signals having frequencies within a second predetermined range;

second rectifier means for electrically rectifying the electrical signals passed by said first filter means and for providing an output thereof;

comparator means for comparing the output of said first rectifier means with the output of said second rectifier means; and indicator means, responsive to said comparator means, for indicating when the output of said first rectifier means exceeds the output of said second rectifier means.

16. An apparatus as defined in claim 15, further comprising preamplifier and filter means having an output electrically connected to respective inputs of both said first filter means and said second filter means.

17. An apparatus as defined in claim 16, wherein said indicator means includes oscillator means for providing an oscillating electrical signal.

18. An apparatus as defined in claim 15, wherein said indicator means includes oscillator means for providing an oscillating electrical signal.

19. An apparatus as defined in claim 15, wherein said second rectifier means includes:

operational amplifier means having an inverting input, a non-inverting input, and an output, the non-inverting input receiving the electrical signals passed by said second filter means;

resistive means electrically connected to the output and the inverting input of said operational amplifier means;

variable resistive means connected to the non-inverting input of said operational amplifier means; and amplitude controlling means, connected to the non-inverting input of said operational amplifier means, for limiting the amplitudes of the electrical signals passed by said second filter means.

20. An apparatus as defined in claim 15, wherein said second rectifier means includes threshold setting means for establishing a minimum level which the output of said first rectifier means must exceed before said apparatus warns of the presence of an emergency signal.

21. An apparatus as defined in claim 20, wherein said threshold setting means includes:

operational amplifier means; and variable resistive means connected to an input of said operational amplifier means.

22. An apparatus for warning of the presence of an emergency signal, comprising:

receiver means for receiving electrical signals corresponding to ambient sound;

band-pass filter means for passing the electrical signals having frequencies within the pass band of said band-pass filter means;

first rectifier means for rectifying the electrical signals passed by said band-pass filter means;

low-pass filter means for passing the electrical signals having frequencies within the pass band of said low-pass filter means;

second rectifier means, including:

operational amplifier means;

variable resistive means, connected to said operational amplifier means, for establishing a threshold level; and amplitude controlling means, connected to said operational amplifier means, for limiting the amplitude of the electrical signals passed by said low-pass filter means;

comparator means for comparing the output of said first rectifier means with the output of said operational amplifier means; and indicator means, responsive to said comparator means, for indicating when the ambient sound contains an emergency signal.

23. An apparatus as defined in claim 22 wherein said comparator means includes first amplifier comparator means having first input means for receiving the output from said first rectifier means and having second input means for receiving the output from said second rectifier means.

24. An apparatus as defined in claim 23, wherein said indicator means includes:

oscillator means for generating an oscillating electrical signal; and second amplifier comparator means having first input means for receiving the output from said first amplifier comparator means and having second input means for receiving the oscillating electrical signal from said oscillator means.

25. An apparatus as defined in claim 22, wherein the pass band of said low-pass filter means includes an upper frequency limit of approximately 1 KHz.

26. An apparatus for warning of the presence of an emergency signal, comprising:

first operational amplifier means for receiving electrical signals corresponding to ambient sounds;

second operational amplifier means, having input means connected to an output of said first operational amplifier means, for providing a band-pass filter;

third operational amplifier means, having input means connected to an output of said second operational amplifier means, for rectifying and amplifying;

fourth operational amplifier means, having input means connected to the output of said first operational amplifier means, for providing a low-pass filter;

fifth operational amplifier means, having input means connected to an output of said fourth operational amplifier means, for rectifying and amplifying;

sixth operational amplifier means, having input means for receiving an output from said third operational amplifier means and from said fifth operational amplifier means, for providing a comparator output;

seventh operational amplifier means for providing an oscillating signal; and eighth operational amplifier means, having input means for receiving the comparator output from said sixth operational amplifier means and for receiving the oscillating signal from said seventh operational amplifier means, for controllably outputting an oscillating signal corresponding to the oscillating signal of said seventh operational amplifier means.

27. An apparatus as defined in claim 26, further comprising notifier means, responsive to the oscillating signal of said eighth operational amplifier means, for communicating the presence of the emergency signal.

* * * * *